(12) United States Patent
Shinoda

(10) Patent No.: US 6,547,970 B1
(45) Date of Patent: Apr. 15, 2003

(54) METHOD FOR THE TREATMENT OF WIPING SOLUTION

(75) Inventor: Nobuyoshi Shinoda, Chiba (JP)

(73) Assignee: Komori Corporation, Tokyo (JP)

( * ) Notice: Subject to any disclaimer, the term of this patent is extended or adjusted under 35 U.S.C. 154(b) by 48 days.

(21) Appl. No.: 09/689,609

(22) Filed: Oct. 13, 2000

(30) Foreign Application Priority Data

Oct. 13, 1999 (JP) .......................................... 11-290589

(51) Int. Cl.[7] .................................................. C02F 1/04
(52) U.S. Cl. ........................ 210/710; 134/12; 159/4.3; 159/11.1; 159/47.3; 159/48.1; 101/170; 210/712; 210/726; 210/737; 210/768; 210/806; 210/770
(58) Field of Search ........................ 34/360, 363, 425, 34/499, 110; 159/4.3, 11.1, 48.1, 47.3; 210/702, 709, 710, 712, 725, 726, 727, 737, 768, 770, 806; 134/10–13; 101/167, 170

(56) References Cited

U.S. PATENT DOCUMENTS 2,862,915 A * 12/1958 Nelson et al. ................. 159/12
3,907,506 A * 9/1975 Malafosse ................... 159/11.1
4,334,953 A * 6/1982 Sridhar ....................... 159/11.1
5,201,943 A * 4/1993 Monnerat ................... 106/31.13
5,426,866 A * 6/1995 Rumocki ..................... 210/609
5,454,939 A * 10/1995 Meuche ...................... 159/43.1
5,855,787 A    1/1999 Giori .......................... 210/651
6,086,722 A * 7/2000 Webster et al. ............... 159/44

FOREIGN PATENT DOCUMENTS

| EP | 0789000 A1 | 8/1997 |
| GB | 2315743 A | 2/1998 |
| JP | 10-85789 A | 4/1998 |

* cited by examiner

Primary Examiner—Peter A. Hruskoci
(74) Attorney, Agent, or Firm—Birch, Stewart, Kolasch, & Birch, LLP

(57) ABSTRACT

A method for the treatment of a wiping solution, characterized by including: adding a flocculant to a used wiping solution for flocculation of ink contained in said used wiping solution; filtering said used wiping solution for separation of said used wiping solution into sludge and a filtrate; heating said filtrate to produce distilled water and a concentrated solution; returning said distilled water for recycling to serve as a raw material of a wiping solution; and heating said concentrated solution for separation of said concentrated solution into steam and a solid residue. An apparatus for performing the method of the present invention is also disclosed.

1 Claim, 2 Drawing Sheets

METHOD FOR THE TREATMENT OF WIPING SOLUTION

BACKGROUND OF THE INVENTION

1. Field of the Invention

The present invention relates to a method and apparatus for the treatment of a wiping solution which is employed for cleaning a wiping roller used for wiping off ink.

2. Background Art

A wiping roller for wiping off excess ink that adheres to intaglios placed around an intaglio cylinder of an intaglio printing press is partially immersed in a wiping solution contained in a wiping-solution tank, so that the ink adhering to the immersed portion is dispersed into the solution; and operation can continue for removal of excess ink from the intaglio cylinder. When such a wiping solution containing dispersed ink is disposed of without being subjected to any treatment, the solution may cause environmental problems. Therefore, a variety of means for the treatment of such a used wiping solution to enable recycling of the solution have already been proposed.

For example, Japanese Patent Application Laid-Open (kokai) No. 10-85789 discloses a method for the treatment of a used wiping solution. In the method, a used wiping solution is separated into a transparent solution and a residual solution by use of an ultrafiltration membrane (UF membrane), and the transparent solution is recycled as a raw material of a wiping solution; a flocculant (an alkali salt) is added to the residual solution for flocculation of ink components; the resultant solution is subjected to filtration to thereby produce a solid product and a filtrate; the solid product is disposed of as waste, and the filtrate is neutralized and then separated into a distilled water and a concentrated salt solution through distillation; and the distilled water is recycled as a raw material of the wiping solution, and a portion of the concentrated salt solution is recycled as the flocculant.

However, the method disclosed in Japanese Patent Application Laid-Open (kokai) No. 10-85789 involves the following problems:

(1) since a wiping solution concentrated into the form of slurry is subjected to filtration by use of a UF membrane, pores of the membrane tend to become clogged with the slurry, and thus the membrane must be changed frequently, resulting in laborious operation; and (2) solutions which are treated in different ways to have different states—a transparent solution obtained through filtration by use of a UF membrane, distilled water, etc.—are employed as raw materials of a wiping solution, and thus it is difficult to produce a wiping solution having consistent properties.

SUMMARY OF THE INVENTION

In view of the foregoing, an object of the present invention is to provide a method and apparatus for the treatment of a wiping solution, which facilitate the treatment of a used wiping solution and enable the production of a wiping solution having consistent properties.

In order to solve the aforementioned problems, the present invention provides a method for the treatment of a wiping solution, which comprises adding a flocculant to a used wiping solution for flocculation of ink contained in the used wiping solution; filtering the used wiping solution for separation of the used wiping solution into sludge and a filtrate; heating the filtrate to produce distilled water and a concentrated solution; returning the distilled water for recycling to serve as a raw material of a wiping solution; and heating the concentrated solution for separation of the concentrated solution into steam and a solid residue.

In order to solve the aforementioned problems, the present invention also provides an apparatus for the treatment of a wiping solution, which comprises ink flocculation means for flocculating ink contained in a used wiping solution by the addition of a flocculant to the used wiping solution; solid-liquid separation means for separating, into sludge and a filtrate, the used wiping solution containing the ink which is flocculated by the ink flocculation means through filtration of the used wiping solution; distilled water production means for producing distilled water and a concentrated solution through heating of the filtrate which is separated by the solid-liquid separation means; water recycling means for recycling the distilled water which is produced by the distilled water production means as a raw material of a wiping solution; and post treatment means for separating the concentrated solution into steam and a solid residue through heating of the concentrated solution which is produced by the distilled water production means.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with an accompanying drawings, in which.

DETAILED DESCRIPTION OF PREFERRED EMBODIMENTS

Figure 1:
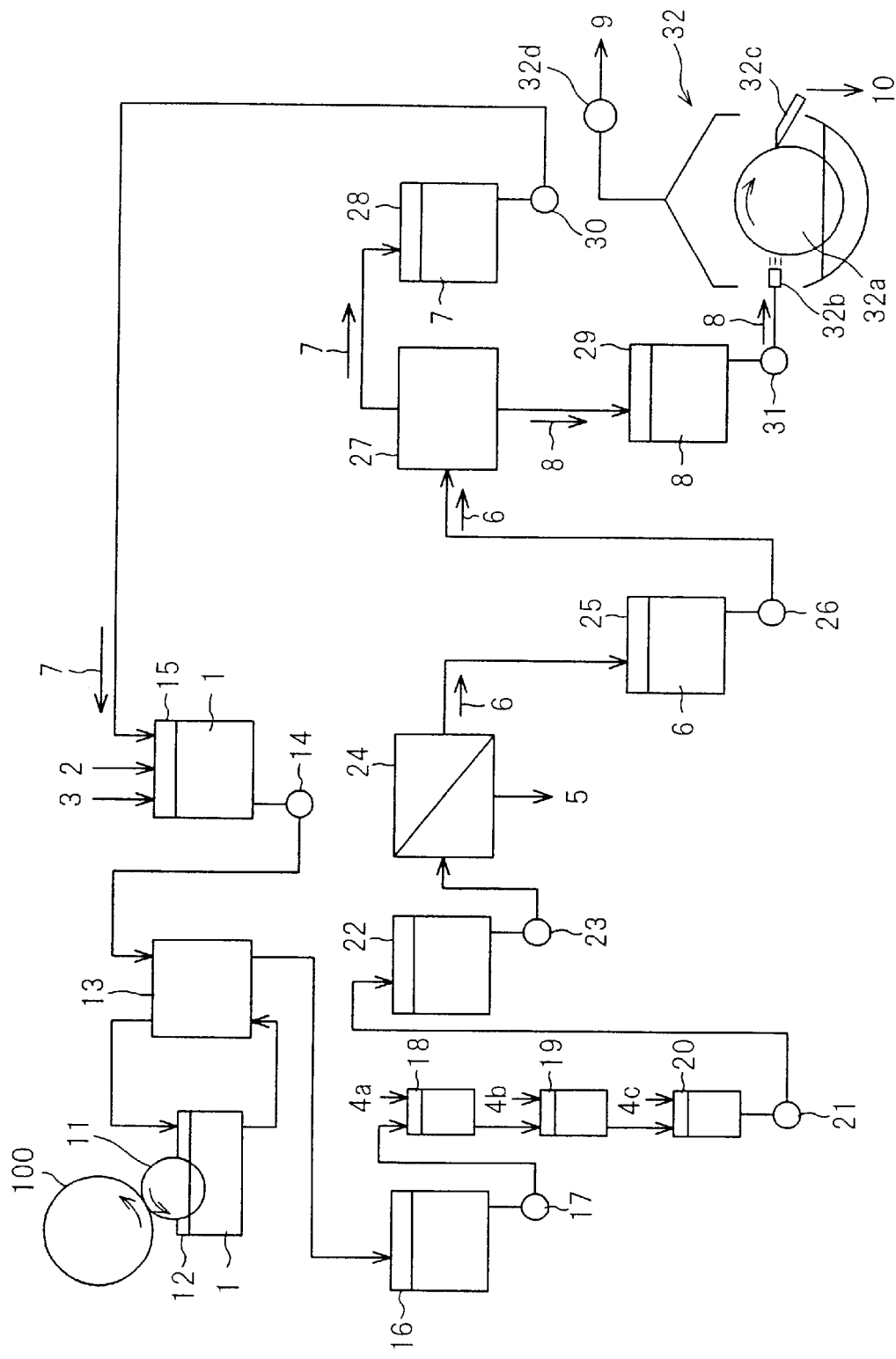
FIG. 1 is a schematic representation showing an embodiment of the apparatus of the present invention for the treatment of a wiping solution.

An embodiment of the method and the apparatus of the present invention for the treatment of a wiping solution will next be described with reference to FIG. 1. FIG. 1 is a schematic representation showing the apparatus for the treatment of a wiping solution.

As shown in FIG. 1, a wiping roller 11 which abuts an intaglio cylinder 100 of an intaglio printing press is immersed in wiping solution 1 in a wiping-solution tank 12. The wiping solution 1 contains water 2 and a surfactant 3 predominantly containing sodium hydroxide (NaOH) and sulfonated castor oil (S.C.O), so as to facilitate dispersion of ink into the solution in accordance with the composition or amount of the ink.

The wiping-solution tank 12 is connected to an inlet port of an adjustment/circulation apparatus 13. An outlet port of the adjustment/circulation apparatus 13 is connected to the wiping-solution tank 12. A supply port of the adjustment/circulation apparatus 13 is connected, via a feed pump 14, to a production tank 15 in which the water 2 and the surfactant 3 are mixed at a predetermined ratio, and stirred, to thereby produce the wiping solution 1. A discharge port of the adjustment/circulation apparatus 13 is connected to a used-solution tank 16.

The adjustment/circulation apparatus 13 maintains the temperature of the wiping solution 1 supplied from the wiping-solution tank 12 at 45–55° C., and measures the amount of the solution 1 and the concentration of a detergent or ink components contained in the solution 1. When the amount of the wiping solution 1 in the apparatus 13 is insufficient, the feed pump 14 is operated, and then a fresh wiping solution 1 is supplied from the production tank 15 to the apparatus 13. When the amount of a detergent component in the wiping solution 1 is small or when the amount of ink components in the solution 1 is large, the used wiping solution 1 circulating in the apparatus 13 is fed to the used-solution tank 16, and a fresh wiping solution 1 is supplied from the production tank 15 to the apparatus 13.

The used-solution tank 16 is connected, via a feed pump 17, to a first flocculation tank 18 into which a first flocculant 4a such as calcium chloride ($CaCl_2$) is supplied. The first flocculation tank 18 is connected to a second flocculation tank 19 into which a second flocculant 4b such as ferric chloride ($FeCl_3$) is supplied. The second flocculation tank 19 is connected to a third flocculation tank 20 into which a filtration accelerator 4c is supplied. The third flocculation tank 20 is connected to a flocculated-solution tank 22 via a feed pump 21. In the present embodiment, the thus-described feed pumps 17 and 21, the first through third flocculation tanks 18–20, and the flocculated-solution tank 22 constitutes the ink flocculation means.

The flocculated-solution tank 22 is connected, via a feed pump 23, to a dehydration filter 24 of a pressure-type or a vacuum-type, which is employed for separating the wiping solution 1 which has undergone the flocculation treatment into sludge 5 and a filtrate 6. A filtrate discharge port of the dehydration filter 24 is connected to a filtrate tank 25. In the present embodiment, the thus-described feed pump 23, the dehydration filter 24, and the filtrate tank 25 constitutes the solid-liquid separation means.

The filtrate tank 25 is connected to a condenser (evaporator) 27 via a feed pump 26. In the condenser 27, the filtrate 6 which is supplied from the filtrate tank 25 is sprayed onto a heat-exchange tube through which a heating medium passes, and is then evaporated and cooled, to thereby produce distilled water 7. A non-evaporated residue is repeatedly sprayed onto the heat-exchange tube, to thereby produce a concentrated solution (salt solution) 8. A distilled water outlet port of the condenser 27 is connected to a distilled water tank 28. A concentrated solution outlet port is connected to a concentrated-solution tank 29. In the present embodiment, the distilled water production means comprises the thus-described feed pump 26, the condenser 27, the distilled water tank 28, and the concentrated-solution tank 29.

The distilled water tank 28 is connected to the production tank 15 via a feed pump 30. The concentrated-solution tank 29 is connected to a dryer (drum dryer) 32 via a feed pump 31. In the dryer 32, the concentrated solution 8 which is supplied from the concentrated-solution tank 29 is blown through a sprayer 32b onto the surface of a drum 32a, the inside of which is heated by steam, to thereby evaporate a liquid component and discharge steam 9 through an exhaust fan 32d. A solid salt 10, a solid residue which adheres to the surface of the drum 32a, is scraped off the surface by use of a scraper 32c and is recovered. In the present embodiment, the water-recycling means includes the feed pump 3 0,and the post treatment means includes the feed pump 31 and the dryer 32.

The method for the treatment of a wiping solution which employs the aforementioned apparatus will next be described.

Excess ink adhered to an intaglio on the intaglio cylinder 100 is wiped off by the wiping roller 11, and then dispersed into the wiping solution 1 in the wiping-solution tank 12. The wiping solution 1 containing the dispersed ink in the wiping-solution tank 12 is supplied to the adjustment/circulation apparatus 13. In the apparatus 13, the solution is maintained at a constant temperature, and the amount of the solution and the concentrations of the surfactant 3 and ink components are measured. When the amount of the wiping solution 1 in the wiping-solution tank 12 is small, the feed pump 14 is operated and a fresh wiping solution 1 in the production tank 15 is supplied to the apparatus 13 for replenishment. When the concentration of the surfactant 3 in the wiping solution 1 is low or when the amount of ink components present in the solution 1 is large, the wiping solution 1 in the wiping-solution tank 12 is fed to the used-solution tank 16, and a fresh wiping solution 1 is supplied from the production tank 15 to the apparatus 13, such that the concentrations of the surfactant 3 and the ink components contained in the wiping solution in the tank 12 fall within a predetermined range.

The wiping solution 1 which is fed to the used-solution tank 16 is supplied from the tank 16 to the first flocculation tank 18 through the feed pump 17, and a first flocculant 4a such as calcium chloride ($CaCl_2$) is added thereto. Subsequently, the resultant solution is fed to the second flocculation tank 19, and a second flocculant 4b such as ferric chloride ($FeCl_3$) is added. Thereafter, the mixture solution is fed to the third flocculation tank 20, and a filtration accelerator 4c is added to the solution, and then the solution is fed to the flocculated-solution tank 22 through the feed pump 23. Through the above procedure, the ink components contained in the wiping solution 1 is flocculated. It should be noted that the filtration accelerator 4c is added to the wiping solution 1 when an oily substance which is difficult to filter is produced through flocculation by the addition of the flocculants 4a and 4b. Whether the filtration accelerator is added or not, or the amount of the accelerator added, is determined in accordance with the type of ink contained in the solution 1.

The wiping solution 1 which has undergone the flocculation treatment is supplied from the flocculated-solution tank 22 to the dehydration filter 24 through the feed pump 23, and then separated into the sludge 5 and the filtrate 6. The sludge 5 is charged into drums or similar containers, and then disposed of. The filtrate 6 is fed to the filtrate tank 25, and then fed to the condenser 27 through the feed pump 26.

The filtrate 6 fed to the condenser 27 is sprayed onto the heat-exchange tube through which a heating medium passes, and then evaporated and cooled. The resultant water is recovered as the distilled water 7 (recovery ratio: about 80%). The non-evaporated residue is repeatedly sprayed onto the heat-exchange tube, to thereby produce a concentrated solution (salt solution) 8.

The thus-produced distilled water 7 is stored temporarily in the distilled water tank 28, and then fed as required to the production tank 15 through the feed pump 30. The distilled water 7 is used as a raw material of a fresh wiping solution 1 after being mixed with water 2 and the surfactant 3 and stirred in the production tank. The concentrated solution 8 is fed to the concentrated-solution tank 29, and then fed to the dryer 32 through the feed pump 31.

The concentrated solution 8 fed to the dryer 32 is blown through the sprayer 32b onto the surface of the drum 32a, the inside of which is heated by steam. On the surface of the drum, liquid components are evaporated and the steam 9 is discharged through the exhaust fan 32d. The components of the steam 9 are similar to those of exhaust from a seawater evaporation system, and thus the steam rarely affects the environment detrimentally. The residual solid salt 10 which is adhered to the surface of the drum 32a is scraped off by use of the scraper 32c, and then recovered into drums or similar containers.

Thus, the used wiping solution 1 is subjected to filtration after flocculation of ink components, and the resultant filtrate is heated and evaporated, to thereby produce distilled water 7. Only the distilled water is recycled as a raw material of the fresh wiping solution 1.

Therefore, clogging does not occur in the dehydration filter 24, and a wiping solution having consistent properties can be easily produced in the production tank 15.

Consequently, the used wiping solution 1 can be easily treated, and even when water contained in the used wiping solution is recycled, a wiping solution having consistent properties can be easily produced.

EXAMPLE

Figure 2:
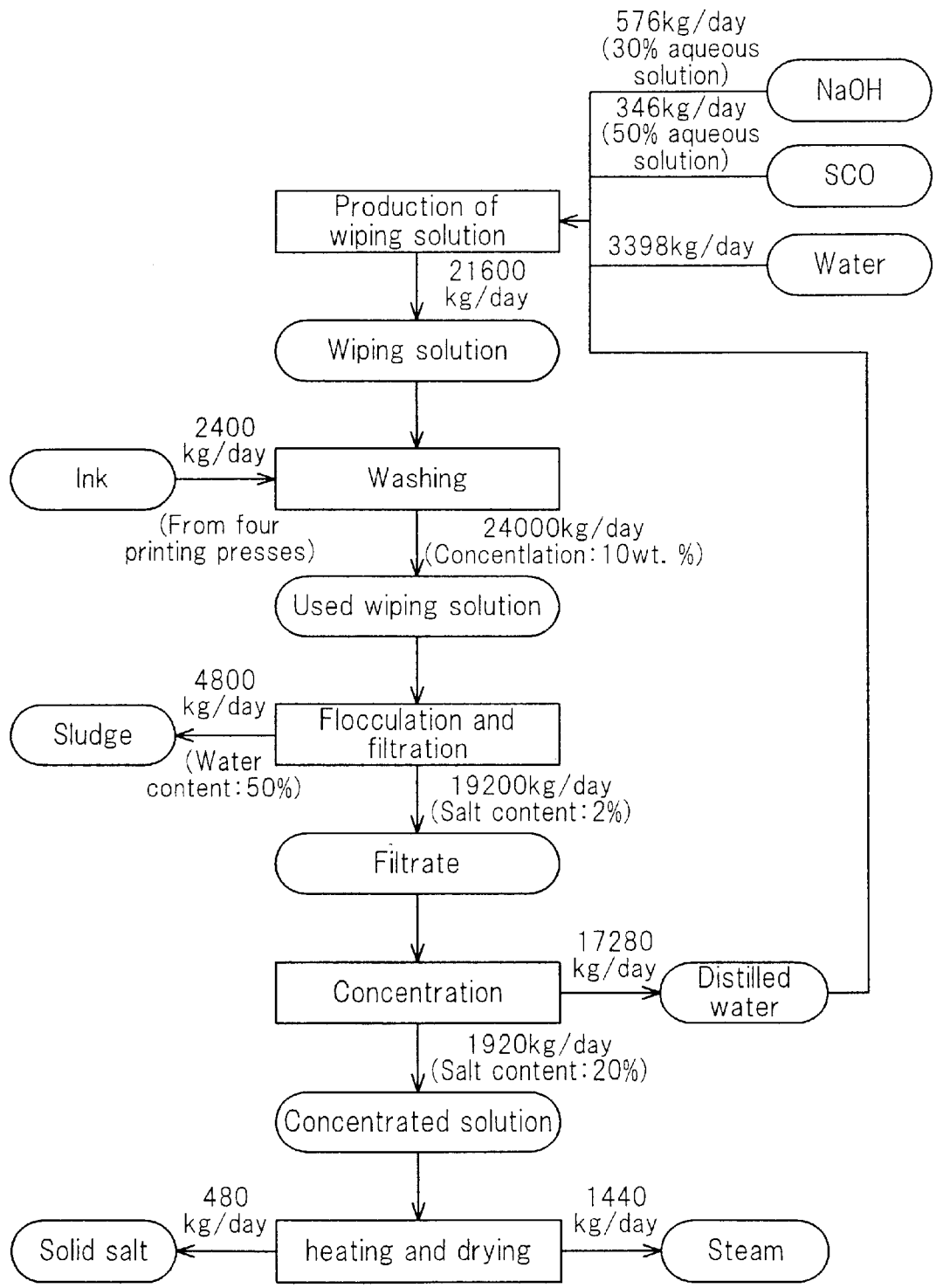
FIG. 2 is a quantity-balance flowchart of the Example of the method of the present invention for the treatment of a wiping solution.

The method and apparatus for the treatment of a wiping solution of the present invention will next be described by way of example with reference to FIG. 2. FIG. 2 is a quantity-balance flowchart of the method for the treatment of a wiping solution of the Example of the present invention.

As shown in FIG. 2, when four intaglio printing presses are employed, ink is dispersed in a wiping solution in an amount of 2,400 kg/day. When a wiping solution is employed in an amount of 21,600 kg/day, the concentration of ink contained in the wiping solution is 10 wt.%, and the amount of used wiping solution is 24,000 kg/day.

A flocculant is added to the used wiping solution to flocculate the ink, and then the resultant solution is subjected to filtration and separation into sludge (water content: 50%) (4,800 kg/day) and a filtrate (salt content: 2%) (19,200 kg/day). The filtrate is concentrated to 1/10, to thereby produce distilled water (17,280 kg/day) and a concentrated solution (salt content: 20%) (1,920 kg/day).

When the percentages of sodium hydroxide and sulfonated castor oil in a fresh wiping solution are set at 0.8 wt.% and the above-produced distilled water is recycled as a raw material of the wiping solution, the amounts of sodium hydroxide (30% aqueous solution) and sulfonated castor oil (50% aqueous solution), which are employed for producing the wiping solution, are 576 kg/day and 346 kg/day, respectively. In this case, the amount of water employed for replenishment is 3,398 kg/day. Therefore, water can be recycled at a recovery ratio of 80%.

When the concentrated solution is heat-dried, steam (1,440 kg/day) and a solid salt (480 kg/day) are produced. Consequently, the amount of waste containing the sludge and the solid salt is 5,280 kg/day; i.e., the amount of waste can be reduced.

In the method and apparatus for the treatment of a wiping solution of the present invention, the used wiping solution is subjected to filtration after flocculation of the ink components contained in the solution; the resultant filtrate is heated and evaporated to thereby produce distilled water; and only the distilled water is recycled as a raw material of a fresh wiping solution. Therefore, clogging does not occur during filtration, and a wiping solution having consistent properties can be easily produced. Consequently, the used wiping solution can be easily treated, and even when water contained in the used wiping solution is recycled, a wiping solution having consistent properties can be easily produced.

What is claimed is:

1. A method for the treatment of a wiping solution for the removal of excess ink from an intaglio cylinder of an intaglio printing press, which comprises:

adding a flocculant to said wiping solution to thereby induce flocculation of ink components contained in said used wiping solution;

filtering said used wiping solution containing flocculated ink components for separation of said used wiping solution into sludge and a filtrate;

heating said filtrate so as to produce distilled water and a concentrated solution;

temporarily storing and recycling said distilled water for use as a raw material for fresh wiping solution; and feeding said concentrated solution onto a surface of a drum having an inside surface which is heated by steam and heating said concentrated solution, thereby evaporating liquid components contained in said concentrated solution into steam, while allowing solid residue to deposit on the surface of the drum, whereby said concentrated solution is separated into steam and a solid residue.

* * * * *